(No Model.)

G. VAN NEST.
NUT LOCK.

No. 404,370. Patented May 28, 1889.

WITNESSES,
Harry L. Amer
J. J. Masson

INVENTOR,
George Van Nest
by E. E. Masson
Attorney.

UNITED STATES PATENT OFFICE.

GEORGE VAN NEST, OF RARITAN, NEW JERSEY, ASSIGNOR OF ONE-HALF TO GARRET V. CLICKENER, OF SAME PLACE.

NUT-LOCK.

SPECIFICATION forming part of Letters Patent No. 404,370, dated May 28, 1889.

Application filed February 7, 1889. Serial No. 298,977. (No model.)

*To all whom it may concern:*

Be it known that I, GEORGE VAN NEST, a citizen of the United States of America, residing at Raritan, in the county of Somerset and State of New Jersey, have invented certain new and useful Improvements in Nut-Locks, of which the following is a specification, reference being had therein to the accompanying drawings.

My invention relates to that class of nut-locks which are partly contained in the nut and partly on the outside thereof to securely retain the nut when screwed up and prevent the accidental unscrewing or tampering with the nut.

The invention consists in the combination of a perforated plate, a bolt, a nut thereon, a spring-pin having its flat head resting in a countersunk cavity in the top of the nut and a second nut in engagement with the screw-thread of the bolt and resting upon the head of the locking spring-bolt, as hereinafter described, and specifically set forth in the claim.

Figure 1:
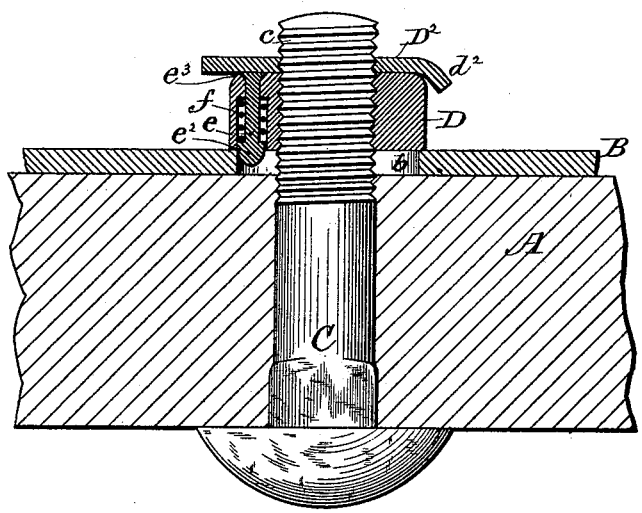
Figure 2:
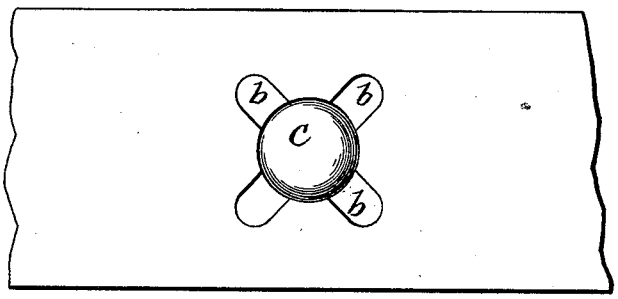
Figure 3:
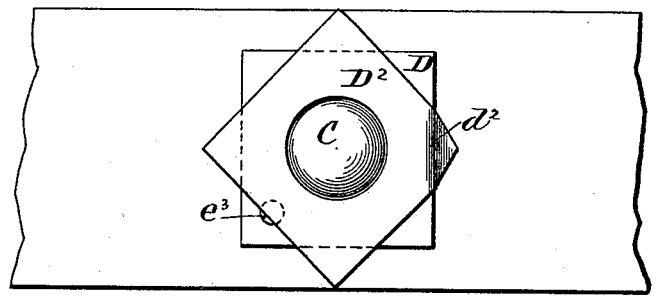

In the accompanying drawings, Figure 1 is a longitudinal section through a lock-nut constructed in accordance with my invention. Fig. 2 is a front view of the perforated plate used under the nut. Fig. 3 represents a front view of the nut locked to the perforated plate.

In said drawings, A represents a bar that may be a portion of one of the rails of a railway-track, and B another bar that may be one of the fish-plates of said track.

C is the bolt to unite said bars together. Said bolt has a thread, $c$, cut thereon, of uniform size, to retain the main nut D and the auxiliary nut $D^2$. The nut D has a perforation parallel with its axis, and within said perforation is placed a shouldered pin, $e$, the point $e^2$ of which is semi-spherical and of suitable size to readily enter one of the perforations, recesses, or grooves $b$, formed in the plate B in close proximity to the hole punched therein for the passage of the bolt C.

Upon the shank of the pin $e$ is placed a coiled spring, $f$, having one end abutting against the bottom of the perforation in the nut D to force the point of the pin beyond the inner face of said nut; but to prevent the disconnection of the pin $e$ from the nut a flat head, $e^3$, is formed upon its outer end by swaging or hammering the end of said pin, and to receive the head $e^3$ within the body of the nut a countersunk cavity is formed in the nut, so that the top of the flat head $e^3$ will be even with the outer face of the nut when the latter is locked by the pin. To insure the retention of the point of the locking-pin within one of the recesses $b$ of the bar B, the auxiliary nut $D^2$ is run upon the thread of the bolt C until it rests upon the face of the nut and upon the head $e^3$ of the locking-pin, and to prevent malicious tampering with the nuts D $D^2$ the latter is made sufficiently thin, so that one or more of its corners can be battered or bent over, as shown at $d^2$, over the edge or edges of the nut D and requires special tools for its removal.

I am aware that nut-locks have been made in the form of a pin and spring inserted in the nut, said pin having its point engaging in the perforations of a plate and its opposite end bent over the face of the nut, and also that spring-washers have been forced upon the thread of the bolt and made to press upon the nut, and also that a bolt provided with right and left hand threads has been provided with a nut upon each thread and the edge of the outer nut has been bent upon the inner nut, and I do not claim either one of said constructions.

What I claim is—

The combination of a plate having perforations therein, a bolt, a nut, D, thereon, a coiled spring, and a pin within said nut, the nut having a countersunk seat for the head of the pin, with an auxiliary nut, $D^2$, upon the same screw-thread of the bolt as the nut D, whereby the spring-pin is locked, substantially as described.

In testimony whereof I affix my signature in presence of two witnesses.

GEORGE VAN NEST.

Witnesses:
 A. B. ROHN, Jr.,
 JAS. F. DONALDSON.